United States Patent
Tajima et al.

(10) Patent No.: US 11,211,887 B2
(45) Date of Patent: Dec. 28, 2021

(54) MOTOR CONTROL DEVICE AND MACHINE TOOL

(71) Applicant: FANUC CORPORATION, Yamanashi (JP)

(72) Inventors: Daisuke Tajima, Yamanashi (JP); Yuuki Morita, Yamanashi (JP); Tadashi Okita, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/860,110

(22) Filed: Apr. 28, 2020

(65) Prior Publication Data
US 2020/0382034 A1 Dec. 3, 2020

(30) Foreign Application Priority Data
May 31, 2019 (JP) .............................. JP2019-102626

(51) Int. Cl.
*H02K 7/14* (2006.01)
*H02P 21/22* (2016.01)
*B23Q 15/12* (2006.01)

(52) U.S. Cl.
CPC .............. *H02P 21/22* (2016.02); *B23Q 15/12* (2013.01); *B23Q 2705/02* (2013.01)

(58) Field of Classification Search
CPC ....... H02P 21/22; H02P 21/14; G05B 19/404; G05B 19/416; G05B 2219/42062
See application file for complete search history.

(56) References Cited

U.S. PATENT DOCUMENTS 4,374,353 A * 2/1983 Habisohn ................ B66C 13/26
318/742
2019/0363652 A1* 11/2019 Tanabe ................... G01D 3/024

FOREIGN PATENT DOCUMENTS

JP H03027785 A 2/1991

* cited by examiner

*Primary Examiner* — Karen Masih
(74) *Attorney, Agent, or Firm* — Studebaker & Brackett PC

(57) ABSTRACT

A motor control device according to an aspect of the present disclosure controls a motor by switching between speed control and position control, and sets a maximum voltage applied to the motor during the position control to lower than a maximum voltage applied to the motor during the speed control.

6 Claims, 4 Drawing Sheets

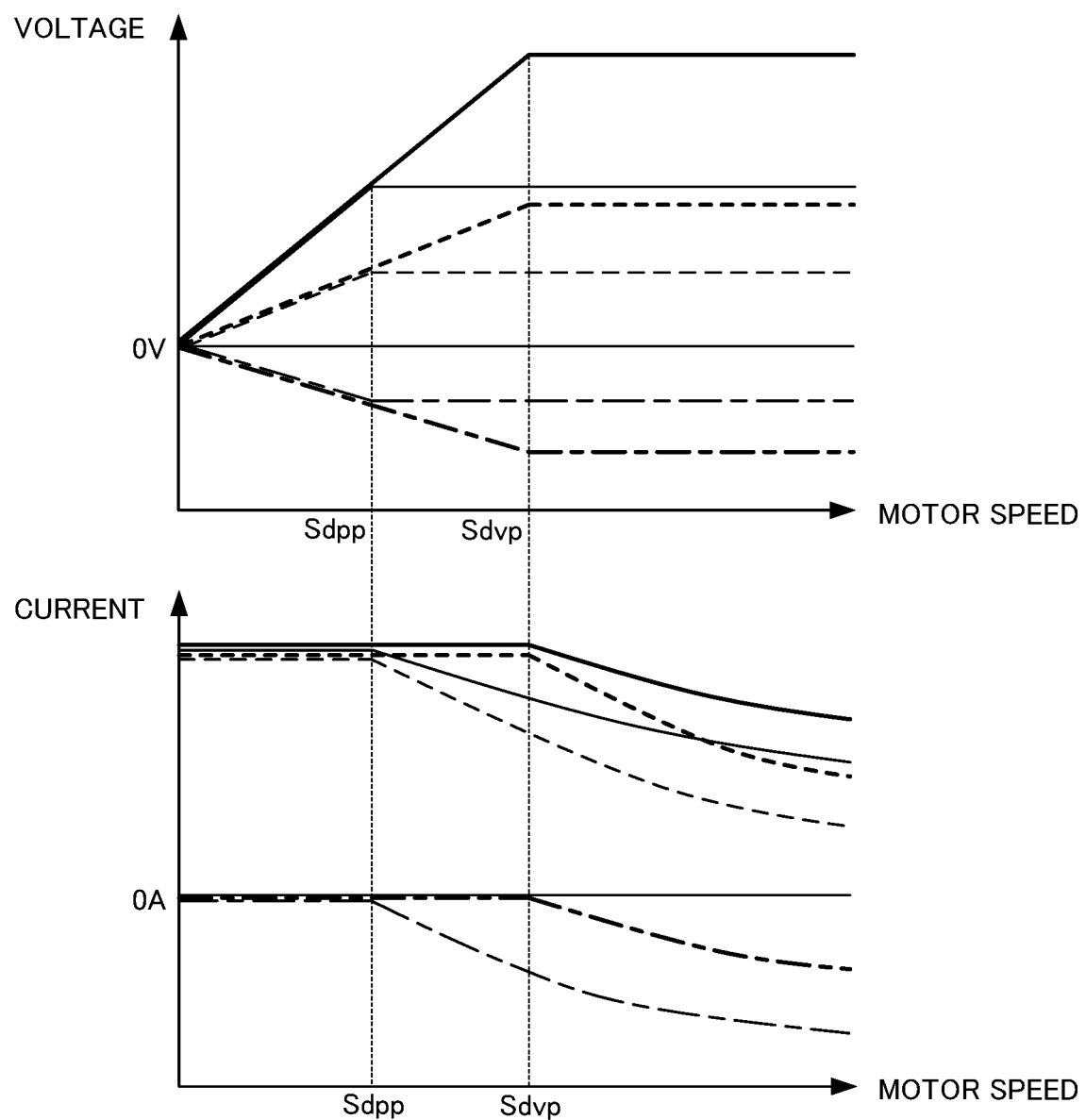

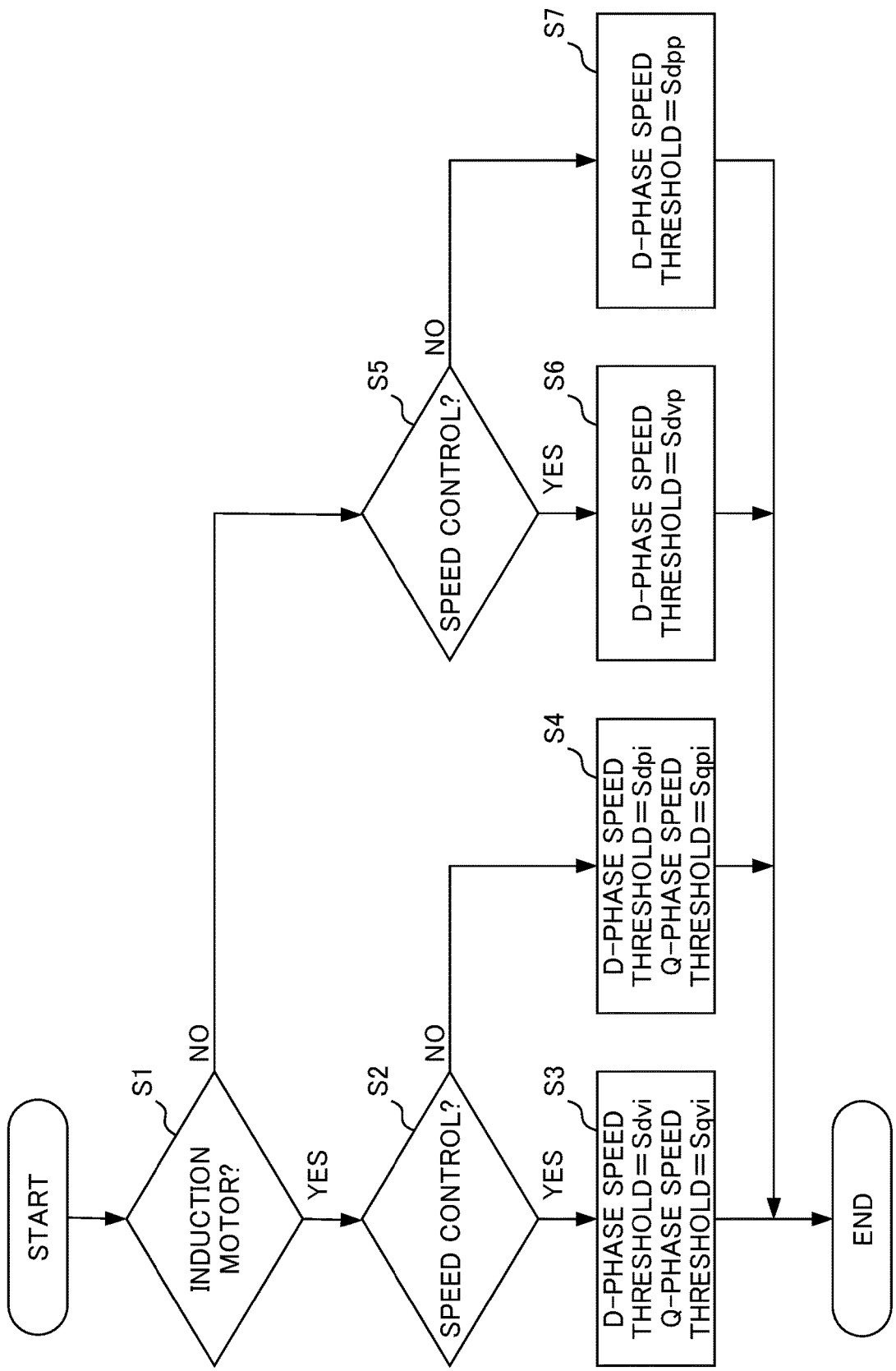

MOTOR CONTROL DEVICE AND MACHINE TOOL

This application is based on and claims the benefit of priority from Japanese Patent Application No. 2019-102626, filed on 31 May 2019, the content of which is incorporated herein by reference.

BACKGROUND OF THE INVENTION

Field of the Invention

The present invention relates to a motor control device and a machine tool.

Related Art

A variety of motor control devices that control motors are being implemented. In the control of motors, there is speed control which makes the rotational speed of the motor match a target speed, and position control which makes a rotation angle position of a motor match a target position. For example, for a spindle motor of a machine tool, there are cases where it is desired for speed control to be possible so as to reach the optimum rotational speed in machining during machining, and for position control to be possible upon replacing a workpiece or tool mounted to the spindle so as to position the angular position thereof at a predetermined position. Therefore, a control device capable of switching between speed control and position control has also been proposed (for example, refer to Patent Document 1).

The control device of an induction motor described in Patent Document 1 has an object of trying to improve the cutting speed during rotation position control mode and improve the cutting limit capacity, and includes "a gain switching means which switches and changes the gain of at least one of the electrical current and speed loop in the case of rotational position control to a larger value than a case of rotational speed control".

Patent Document 1: Japanese Unexamined Patent Application, Publication No. H03-27785

SUMMARY OF THE INVENTION

The control of a motor control device is premised on a predetermined primary source voltage being inputted; however, it is considered that the primary source voltage will not satisfy the design voltage depending on a variety of factors. In the case of the primary source voltage not being sufficient, even if the motor control device outputs a signal to cause a large torque to be generated in the motor, the output torque of the motor will not comply. There is concern over the divergence between the calculated torque of such a motor and the actual output torque making the control unstable, particularly upon position control. For this reason, technology is desired which can appropriately control a motor also in the case of the primary source voltage not satisfying the design voltage.

A motor control device according to an aspect of the present disclosure controls a motor by switching between speed control and position control, and sets a maximum voltage applied to the motor during the position control to lower than a maximum voltage applied to the motor during the speed control.

According to the motor control device and motor control method of the present disclosure, it is possible to control a motor appropriately, also in a case of the primary power source voltage not being sufficient.

BRIEF DESCRIPTION OF THE DRAWINGS

FIG. 3 is a graph showing the general change of current and voltage relative to motor speed in a case of controlling a synchronous motor by the motor control device of FIG. 1; and FIG. 4 is a flowchart showing a sequence of control of a motor by the motor control device of FIG. 1.

DETAILED DESCRIPTION OF THE INVENTION

Figure 1:
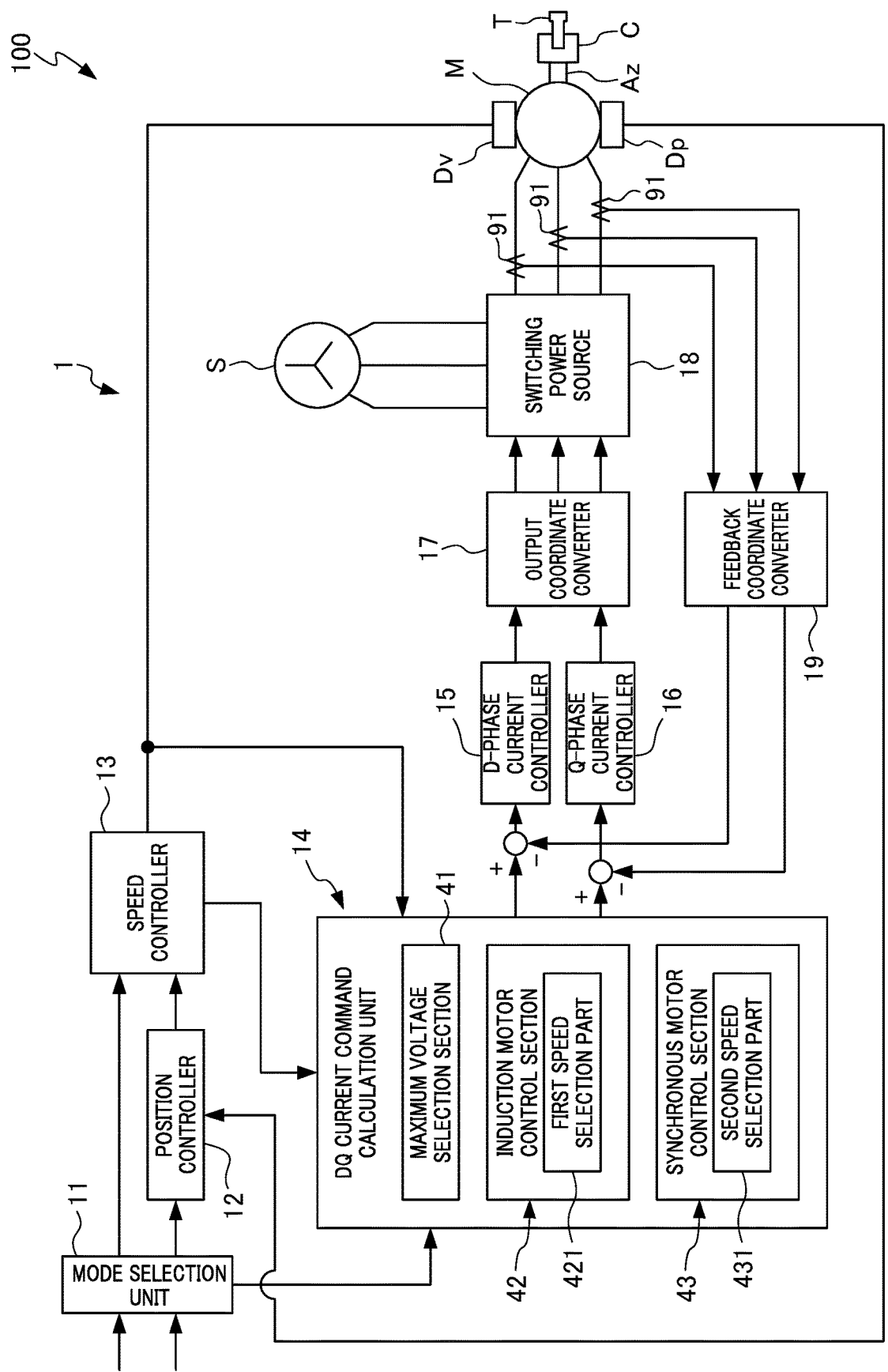
FIG. 1 is a block diagram showing the configuration of a machine tool equipped with a motor control device according to an embodiment of the present disclosure.

Hereinafter, an embodiment of the present disclosure will be explained while referencing the drawings. FIG. 1 is a block diagram showing the configuration of a machine tool 100 according to an embodiment of the present disclosure.

The machine tool 100 includes a motor control device 1, and a spindle motor M controlled by the motor control device 1. The motor control device 1 in itself is an embodiment of the motor control device according to the present disclosure. The machine tool 100, although not shown, may further include one or a plurality of drive motors other than the spindle motor M, and one or a plurality of control devices which control these drive motors.

The spindle motor M is a motor which drives a spindle having a chuck C that retains a tool T. The spindle motor M may be an induction motor, or may be a synchronous motor. In this spindle motor M, a speed sensor Dv which detects the rotational speed and a position sensor Dp which detects the rotational position are provided.

The motor control device 1 controls the spindle motor M by switching between speed control and position control. For this reason, a speed command indicating the rotational speed it should have at every time of the spindle motor M and a position command indicating the rotational position it should have at every time of the spindle motor M are inputted as necessary to the motor control device 1. In other words, the motor control device 1 can both perform speed control which controls the rotational speed of the spindle motor M so as to match the speed command, and perform position control which controls the rotational speed position of the spindle motor M so as to match the position command.

The motor control device 1 includes: a mode selection unit 11; a position controller 12; a speed controller 13; a dq current command calculation unit 14; a d-phase current controller 15; a q-phase current controller 16; an output coordinate converter 17; a switching power source 18; and a feedback coordinate convertor 19. The mode selection unit 11, position controller 12, speed controller 13, dq current command calculation unit 14, d-phase current controller 15, q-phase current controller 16, output coordinate converter 17 and feedback coordinate converter 19, for example, can be realized by introducing the appropriate programs to a computer device having a. CPU, memory, etc. These constituent elements may be realized by the same computer device. In other words, these constituent elements are distinguished functionally, and may not necessarily be clearly distinguishable in the physical configuration or program configuration.

The mode selection unit 11 selects whether to perform speed control which controls the motor based on the speed command, or to perform position control which controls the motor based on the position command. The mode selection unit 11 may be configured so as to select either of speed control and position control by receiving a selection signal indicating whether to perform speed control or to perform position control, or may be configured so as to select speed control when the speed command was inputted, and to select position control when the position command was inputted. The mode selection unit 11 inputs the speed command to the speed controller 13 in a case of selecting the speed control, and inputs the position command to the position controller 12 in a case of selecting the position control. In addition, the mode selection unit 11 inputs the selection signal specifying the selected type of control to the do current command calculation unit 14.

The position controller 12 calculates the rotational speed of the spindle motor M which can bring the rotational position of the spindle motor M to the rotational position indicated by the position command, based on the error between the rotational position of the spindle motor M detected by the position sensor Dp and the position command. The position controller 12 inputs the calculated rotational speed of the spindle motor M to the speed controller 13 as a speed command.

The speed controller 13 calculates the speed error between the speed command inputted from the mode selection unit 11 or speed command inputted from the position controller 12, and the rotational speed of the spindle motor N detected by the speed sensor Dv, and inputs the calculated speed error to the dq current command calculation unit 14.

The dq current command calculation unit 14 calculates the d-phase current command value and q-phase current command value which can reduce the speed error, according to the speed error inputted from the speed controller 13. The dq current command calculation unit 14 inputs the calculated d-phase current command value to the d-phase current controller 15, and inputs the calculated q-phase current command value to the q-phase current controller 16. It should be noted that the d-phase is a phase component forming the magnetic flux of the spindle motor M, and the q-phase is a phase component generating the torque.

The dq current command calculation unit 14 has a maximum voltage selection section 41, an induction motor control section 42, and a synchronous motor control section 43. The maximum voltage selection section 41, induction motor control section 42 and synchronous motor control section 43 are sections made by distinguishing for convenience by the functions of the dq current command calculation unit 14, and may not necessarily be clearly distinguishable in the physical configuration or program configuration.

The maximum voltage selection section 41 sets the maximum voltage to be applied to the spindle motor M, based on the selection signal inputted from the mode selection unit 11. This maximum voltage selection section 41 sets the maximum voltage to be applied to the spindle motor M during positional control to be lower than the maximum voltage to be applied to the spindle motor N during speed control. The maximum voltage during speed control is preferably set to the rated voltage upon design of the spindle motor M. The maximum voltage upon position control is preferably defined as the actually applicable voltage from the primary power source S supplying electrical power to the switching power source 18. The maximum voltage selection section 41 may be configured so that the operator or serviceman can arbitrarily set the maximum voltage during position control in advance, or may be configured so as to be set in advance by input from a server or the like connected to the motor control device 1. For this reason, the maximum voltage selection section 41 may be established as a configuration retaining the value of the selection signal of the mode selection unit 11.

The induction motor control section 42 is used in a case of the spindle motor M being an induction motor. The induction motor control section 42 keeps the d-phase current command value at the optimum value upon design of the spindle motor P and causes the q-phase current command value to change so as to decrease the speed error, in a low-speed region in which the rotational speed of the spindle motor M is low. It should be noted that, in a case of the spindle motor M normally rotating, the q-phase current command value also becomes a fixed value irrespective of the rotational speed. In addition, the induction motor control section 42, in a medium-speed region in which the rotational speed of the spindle motor M is somewhat high, makes the d-phase current command value smaller as the rotational speed of the spindle motor M increases, and in a high-speed region in which the rotational speed of the spindle motor M is even higher, makes both the d-phase current command value and q-phase current command value smaller as the rotational speed of the spindle motor M increases.

For this reason, the induction motor control section 42 can be established as a configuration having a first speed selection part 421 which specifies a d-phase speed threshold at which starting to decrease the d-phase current command value and a q-phase speed threshold at which starting to decrease the q-phase current command value, according to the acceleration of the rotational speed of the spindle motor M. In the induction motor control section 42, the first speed selection part 421 sets the speed of the spindle motor M at which starting to decrease the d-phase current and q-phase current during position control to be lower than during speed control.

Figure 2:
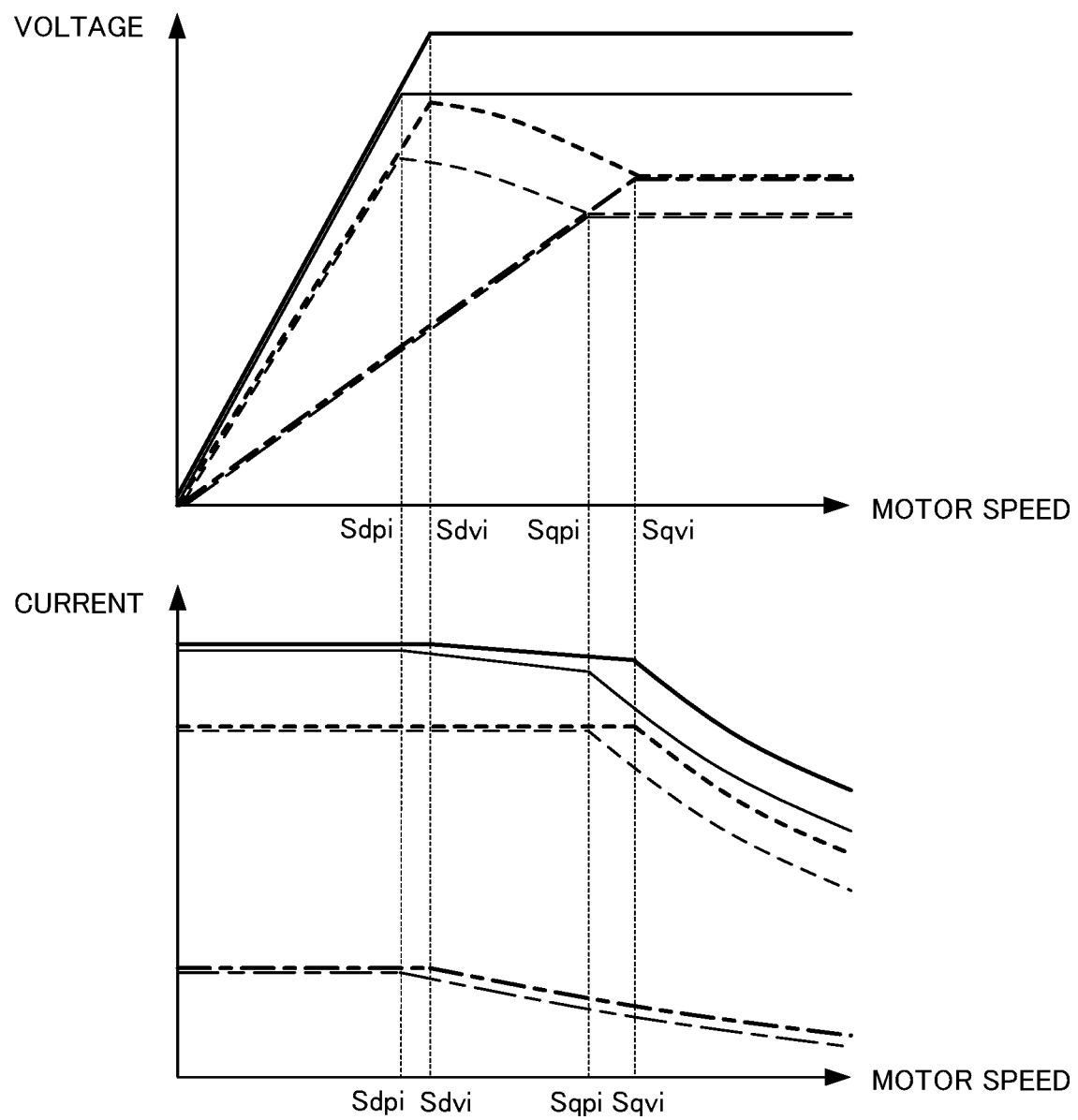
FIG. 2 is a graph showing the general change of current and voltage relative to motor speed in a case of controlling an induction motor by the motor control device of FIG. 1.

FIG. 2 shows the general change of the d-phase current command value and q-phase current command value calculated by the induction motor control section 42 relative to the speed of the spindle motor M, and the general change of the voltage for outputting an electrical current corresponding to the d-phase current command value and q-phase current command value. It should be noted that FIG. 2 shows the values in the case of the spindle motor M regularly rotating, and each value can fluctuate relative to the value intended for decreasing the speed error.

FIG. 2 shows the d-phase current and d-phase voltage by a single-dot chain line, shows the q-phase current and q-phase voltage by a dashed line, and shows the composite current of the d-phase current and q-phase current as well as the composite voltage of the d-phase voltage and q-phase voltage (vector sum) by solid lines. In addition, FIG. 2 shows each value in the case of speed control by bold line, and shows each value in the case of position control by thin line. It should be noted that the figures, in order to avoid the lines from overlapping and not being able to distinguish, are illustrated to slightly shifting lines which would overlap.

The impedance of the spindle motor M is substantially proportional to the frequency of the drive current, i.e. rotational speed of the spindle motor M. For this reason, the d-phase voltage and q-phase voltage required in order to keep the d-phase current and q-phase current in the low-speed region at the optimal values of the spindle motor M, respectively, become values substantially proportional to the rotational speed of the spindle motor M. If the composite voltage of the d-phase voltage and q-phase voltage exceeds the voltage of the primary power source S, it is not possible to supply sufficient current to the spindle motor M, and the control becomes unstable due to deviation between the output upon calculation and the actual output. For this reason, the first speed selection part 421 sets the d-phase speed threshold (value during speed control defined as Sdvi, and value during positional control defined as Sdpi) to the rotational speed of the spindle motor M considered to reach the maximum voltage to which the composite voltage of the d-phase voltage and q-phase voltage corresponding to the d-phase current command value and q-phase current command value is set by the maximum voltage selection section 41. It should be noted that the first speed selection part 421 can be configured so as to set the d-phase speed threshold, by a method such as referencing a reference table indicating the relationship between the maximum voltage and d-phase speed threshold, for example.

The induction motor control section 42, in the medium-speed region in which the rotational speed of the spindle motor M exceeds the d-phase speed thresholds Sdvi, Sdpi, causes the d-phase current command value to decline accompanying an increase in the rotational speed of the spindle motor M, so that the composite voltage of the d-phase voltage and q-phase voltage will equal the maximum voltage set by the maximum voltage selection section 41.

If the rotational speed of the spindle motor M further increases, the q-phase voltage declines until equaling the d-phase voltage. If the q-phase voltage becomes lower than the d-phase voltage, there is concern over the spindle motor M not being able to generate the drive torque appropriately. For this reason, the first speed selection part 421 sets the q-phase speed threshold (value during speed control defined as Sqvi, and value during position control defined as Sqpi) to the rotational speed of the spindle motor M considered to reach the maximum voltage at which the composite voltage of the d-phase voltage and q-phase voltage is set by the maximum voltage selection section 41, in the case of equaling the d-phase voltage and q-phase voltage. The q-phase speed threshold can be set by referencing the reference table.

The induction motor control section 42, in the high-speed region in which the rotational speed of the spindle motor M exceeds the q-phase speed threshold Sqvi, Sqpi, causes the d-phase current command value and q-phase voltage command value to decline accompanying an increase in the rotational speed of the spindle motor M so that the composite voltage of the d-phase voltage and q-phase voltage becomes the maximum voltage set by the maximum voltage selection part 41, and the d-phase voltage and q-phase voltage become equal.

The motor control device 1 can control the spindle motor M appropriately, also in a case of the voltage of the primary power source S being less than the design voltage, since the output of the spindle motor M continuously changes relative to a rise in rotational speed, by the induction motor control section 42 causing the d-phase current command value and q-phase voltage command value to change according to the rotational speed of the spindle motor M.

In addition, with the motor control device 1, the maximum voltage selection section 41 sets the maximum voltage to be applied to the spindle motor M during position control to be lower than the maximum voltage to be applied to the spindle motor P during speed control. The motor control device 1 thereby makes it possible to prevent the voltage upon calculation and the actual voltage from deviating during position control and the control of the spindle motor M from becoming unstable, and to accelerate faster the spindle motor M by increasing the output using the voltage actually obtained during speed control as the upper limit.

The synchronous motor control section 43 is used in a case of the spindle motor M being a synchronous motor. The synchronous motor control section 43, in a case of the spindle motor M being a synchronous motor having permanent magnets, although the d-phase current for forming magnetic flux is unnecessary, can suppress the increase in composite voltage by applying the d-phase current in order to cancel out the electromotive force by armature reaction. However, when applying the d-phase current, the current value increases and the heat generation by Joule loss becomes great.

The synchronous motor control section 13 adjusts the q-phase current command value so that the composite voltage of the d-phase voltage and q-phase voltage does not exceed the maximum voltage set by the maximum voltage selection section 41. In addition, the synchronous motor control section 43, in the low-speed region in which the rotational speed of the spindle motor M is low, suppresses an increase in Joule loss due to an increase in composite current, by ignoring the electromotive force by armature reaction and keeping the d-phase current at zero. Then, the synchronous motor control section 43, in the high-speed region in which the rotational speed of the spindle motor M is high, causes the d-phase current command value to increase in the negative direction accompanying a rise in the rotational speed of the spindle motor M, so as to be able to offset a further increase or electromotive force by the armature reaction.

For this reason, the synchronous motor control section 13 can be established as a configuration having a second speed selection part 431 which specifies the d-phase speed threshold (defining the value during speed control as Sqvp, and the value during position control as Sqpp) at which starting to set the d-phase current command value to a value relative to the increase in rotational speed of the spindle motor M. In the synchronous motor control section 43, the second speed selection part 431 sets the d-phase speed threshold Sqpp during position control to be lower than the d-phase speed threshold Sqvp during speed control.

FIG. 3 shows the general change of the d-phase current command value and q-phase current command value calculated by the synchronous motor control section 43 relative to the speed of the spindle motor M, and the general change in voltage for outputting the current corresponding to the d-phase current command value and q-phase current command value. It should be noted that FIG. 3 shows the values in the case of the spindle motor M regularly rotating, and each value can fluctuate relative to the value illustrated for decreasing the speed error. FIG. 3 shows the d-phase current and d-phase voltage by a one-dot dashed line, shows the q-phase current and q-phase voltage by a dashed line, and shows the composite current of the d-phase current and q-phase current as well as the composite voltage of the d-phase voltage and q-phase voltage by solid lines. In addition, FIG. 3 shows each value in the case of speed control by bold lines, and shows each value in the case of position control by thin lines.

As illustrated, with the motor control device 1, by setting the d-phase speed threshold Sqpp to a low speed during position control, the decline in the high-speed region of the q-phase current which can be applied to the spindle motor M is reduced in comparison with during speed control. The motor control device 1 is thereby superior in stability of control in the high-speed region. On the other hand, although the decline of q-phase current in the high-speed region increases during speed control, the motor control device 1 can suppress the heat generation due to the current value becoming smaller by setting the d-phase current to be smaller. During speed control, since the influence due to heat generation tends to increase due to continuing to rotate the spindle motor M continuously for a relatively long time at fixed speed, it is more advantageous to decrease the dphase current to suppress heat generation.

The d-phase current controller 15 causes the output value to change so as to make the actual d-phase current command applied to the spindle motor M match the d-phase current command value inputted from the induction motor controller section 42 or synchronous motor control section 43 of the dq-current command calculation unit 14.

The q-phase current controller 16 causes the output value to change so as to make the actual q-phase current applied to the spindle motor M match the q-phase current command value inputted from the induction motor control section 42 or synchronous motor control section 43 of the dq current command calculation unit 14.

The output coordinate converter 17 converts the output value of the d-phase current controller 15 and the output value of the q-phase current control 16 into the voltage command of each phase of three-phase AC.

The switching power source 18 applies the voltage indicated from the output coordinate converter 17 to each phase of the spindle motor M. The d-phase current substantially equal to the d-phase current command value and the q-phase current substantially equal to the q-phase current command value are applied to the spindle motor M.

A feedback coordinate converter 19 dq converts the detection signals of three transformers 91 detecting the three-phase current values actually applied to the spindle motor M, and feeds back as the negative feedback signal to the d-phase current controller 15 and q-phase current controller 16. The values of the d-phase current and q-phase current applied to the spindle motor M are thereby made to match the d-phase current command value and q-phase current command value.

FIG. 4 shows a sequence of the control method of the spindle motor M carried out by the motor control device 1. The control method of the spindle motor M by the motor control device 1 includes: a step of confirming whether the type of the spindle motor M is an induction motor or synchronous motor (Step S1: motor type confirmation step; a step of confirming the classification of control as speed control or position control, in the case of the spindle motor M being an induction motor (Step S2: second control classification confirmation step); a step of setting the d-phase speed threshold and q-phase speed threshold so that the maximum value of voltage applied to the spindle motor M becomes a predetermined maximum voltage, in a case of the spindle motor M being an induction motor and the classification of control being speed control (Step S3: first threshold setting step) ; a step of setting the d-phase speed threshold and q-phase speed threshold so that the maximum value of voltage applied to the spindle motor M becomes a predetermined maximum voltage lower than the maximum voltage set in the first threshold setting step, in the case of the spindle motor M being an induction motor, and the classification of control being position control (Step S4: second threshold setting step); step of confirming the classification of control is speed control or position control, in a case of the spindle motor M being a synchronous motor (Step S5: second control classification confirmation step) a step of setting the d-phase speed threshold so that the maximum value of the voltage applied to the spindle motor M becomes a predetermined maximum voltage, in a case of the spindle motor M being a synchronous motor, and the classification of control being speed control (Step S6: third threshold setting step); and a step of setting the d-phase speed threshold so that the maximum value of voltage applied to the spindle motor M becomes a predetermined maximum value lower than the maximum voltage set in the third threshold setting step, in a case of the spindle motor M being a synchronous motor and the classification of control being position control (Step S7: fourth threshold setting step).

In this way, with the motor control device 1, the maximum voltage selection section 41 sets the maximum voltage to be applied to the spindle motor M upon position control to lower than the maximum voltage to be applied to the spindle motor P during speed control. The motor control device 1 can thereby prevent control from becoming unstable caused by the theoretical output and actual output deviating due to a voltage shortage of the primary power source S during position control, and can thereby accelerate or decelerate the spindle motor M more rapidly using the voltage of the primary power source S at the upper limit during speed control.

In addition, due to having the induction motor control section 42 which sets the rotational speed of the spindle motor M at which starting to decrease the d-phase current and q-phase current during position control by the first speed selection part 421 to lower than during speed control, the motor control device 1 can perform stable position control and rapid speed control in a case of the spindle motor M being an induction motor.

In addition, the motor control device 1 can perform stable position control and rapid speed control also in the case of the spindle motor M being a synchronous motor, due to having the synchronous motor control unit 43 which sets the rotational speed of the spindle motor M at which to start applying the d-phase current during position control by the second speed selection part 431 to lower than during speed control.

The machine tool 100 equipped with such a motor control device 1 can perform stable position control and rapid speed control of the spindle motor M; therefore, it is possible to perform efficient machining by rapid acceleration/deceleration of the tool T according to speed control, and rapid and reliable replacement of the tool T is possible by accurate rotational positioning of the chuck C according to position control.

Although an embodiment of the present, disclosure has been explained above, the present invention is not to be limited to the aforementioned embodiment. In addition, the effects described in the present embodiment are merely listing the most ideal effects produced from the present invention, and the effects from the present invention are not to be limited to those described in the present embodiment.

As an example, the motor control device according to the present disclosure may control a motor provided to a device other than a machine tool, or may control a drive axis other than the spindle of a machine tool. In addition, the machine tool according to the present disclosure may be one in which a drive axis other than the spindle is controlled by the motor control device according to the present disclosure.

The motor control device according to the present disclosure, so long as setting parameters so that the maximum voltage applied to the motor during position control becomes lower than the maximum voltage applied to the motor during speed control as a result, does not need to calculate a value specifying the maximum voltage.

The motor control device according to the present disclosure is not limited to performing control such as that of the aforementioned embodiment, and only needs to set the maximum voltage during position control to lower than the maximum voltage during speed control. As an example, the motor control device according to the present disclosure may control a motor according to control such as V/f control, or may control a motor by detecting the magnetic flux of the motor and feeding back the detection value of magnetic flux.

The motor control device according to the present disclosure may not necessarily have either of the induction motor control section and synchronous motor control section.

EXPLANATION OF REFERENCE NUMERALS 100 machine tool
1 motor control device
11 mode selection unit
12 position controller
13 speed controller
14 dq current command calculation unit
15 d-phase current controller
16 q-phase current controller
17 output coordinate converter
18 switching power source
19 feedback coordinate converter
41 maximum voltage selection section
42 induction motor control section
421 first speed selection part
43 synchronous motor control section
431 second speed selection part
Dv speed sensor
Dp position sensor
M spindle motor
S primary power source

What is claimed is:

1. A motor control device which controls a motor by switching between speed control and position control, the motor control device comprising:
a power source, wherein
the motor control device sets a maximum voltage applied to the motor during the position control to lower than a maximum voltage applied to the motor during the speed control,
the maximum voltage applied to the motor during the speed control is a rated voltage of the power source, and
the maximum voltage applied to the motor during the position control is an actual voltage of the power source.

2. The motor control device according to claim 1, comprising an induction motor control section which sets a speed of the motor at which starting to decrease d-phase current and q-phase current during the position control to lower than during the speed control.

3. The motor control device according to claim 1, comprising a synchronous motor control section which sets a speed of the motor at which starting to apply d-phase current during the position control to lower than during the speed control.

4. A machine tool comprising:
a motor control device according to claim 1; and
a motor which is controlled by the motor control device.

5. A motor control device which controls a motor by switching between speed control and position control, comprising:
an induction motor control section which sets a speed of the motor at which starting to decrease d-phase current and q-phase current during the position control to lower than during the speed control,
wherein the motor control device sets a maximum voltage applied to the motor during the position control to lower than a maximum voltage applied to the motor during the speed control.

6. A motor control device which controls a motor by switching between speed control and position control, comprising:
a synchronous motor control section which sets a speed of the motor at which starting to apply d-phase current during the position control to lower than during the speed control,
wherein the motor control device sets a maximum voltage applied to the motor during the position control to lower than a maximum voltage applied to the motor during the speed control.

* * * * *